United States Patent
Fleischmann et al.

(10) Patent No.: US 6,666,281 B2
(45) Date of Patent: Dec. 23, 2003

(54) BEARING GUARD FOR A GROUND-WORKING IMPLEMENT

(75) Inventors: Aron Wesley Fleischmann, Ankeny, IA (US); Garrett Lee Goins, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/100,773

(22) Filed: Mar. 19, 2002

(65) Prior Publication Data

US 2003/0178210 A1 Sep. 25, 2003

(51) Int. Cl.⁷ .............................................. A01B 17/00
(52) U.S. Cl. ........................................ 172/508; 384/624
(58) Field of Search ................................. 172/518, 574, 172/599, 601, 604, 508, 776; 384/624, 627, 488, 145

(56) References Cited

U.S. PATENT DOCUMENTS

| | | | | |
|---|---|---|---|---|
| 558,262 A | * | 4/1896 | Darling | 384/209 |
| 1,806,748 A | * | 5/1931 | Edwards | 277/423 |
| 2,733,648 A | * | 2/1956 | Todd | 172/599 |
| 3,623,439 A | * | 11/1971 | Hair et al. | 111/149 |
| 4,278,133 A | * | 7/1981 | de Marcellus | 172/14 |
| 4,659,240 A | * | 4/1987 | Rogus | 384/145 |
| 4,911,564 A | * | 3/1990 | Baker | 384/145 |
| 4,912,798 A | * | 4/1990 | Ganzmann | 15/82 |
| 5,029,435 A | * | 7/1991 | Buchanan | 56/12.1 |
| 5,267,619 A | * | 12/1993 | Eversole | 172/572 |
| 5,415,234 A | * | 5/1995 | Stahl | 172/112 |
| 5,611,292 A | * | 3/1997 | Clark et al. | 111/189 |
| 5,678,930 A | * | 10/1997 | Kreftmeyer et al. | 384/157 |
| 5,957,214 A | * | 9/1999 | Martinez | 172/15 |
| 6,003,611 A | * | 12/1999 | Martinez | 172/15 |
| 6,089,758 A | * | 7/2000 | Ward | 384/537 |
| 6,193,418 B1 | * | 2/2001 | Yamashita | 384/489 |
| 6,412,571 B1 | * | 7/2002 | McIlhargey | 172/572 |

FOREIGN PATENT DOCUMENTS

JP          3-103618        *    4/1991

OTHER PUBLICATIONS

John Deere tandem and offset disks brochure, p. 20, dated Apr. 2001.

* cited by examiner

*Primary Examiner*—Victor Batson

(57) ABSTRACT

A bearing wear guard includes a slotted body portion cast from a wear-resistant metal. The slots receive two bearing mounting bolts which secure the guard in a protecting position in the path of rocks and abrasive debris traveling towards the bearing and bearing support. An upper edge portion conforms generally to the shape of the lower portion of the bearing. The casting includes a grease zerk-protecting area extending upwardly and outwardly from the upper edge portion to protect the zerk from rocks and abrasive material. Leading and trailing trash shedding surfaces on the body portion prevent trash from catching and building up on the guard. The body portion has an L-shaped cross section also providing protection for the bearing mounting bracket.

18 Claims, 2 Drawing Sheets

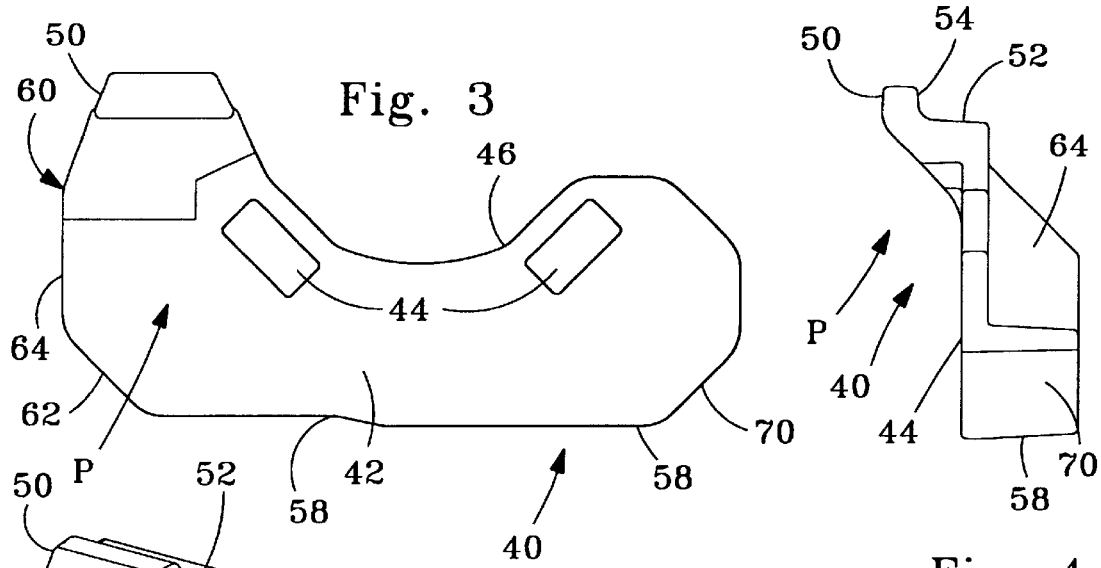
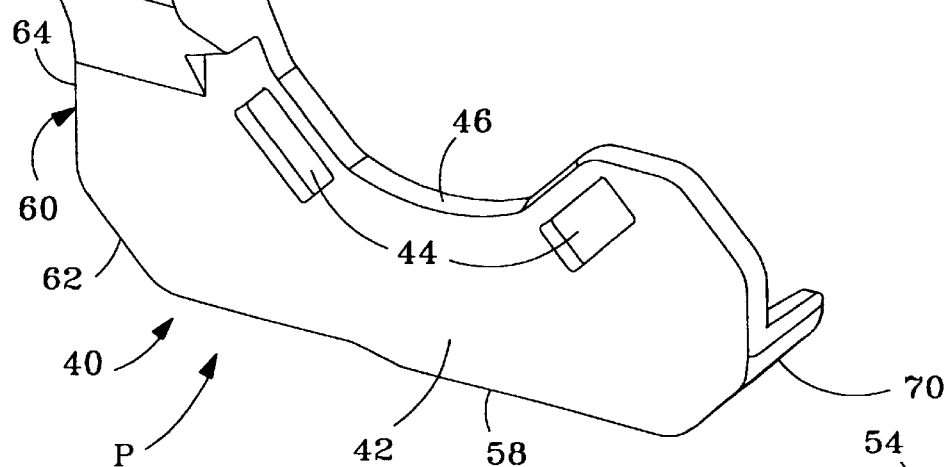
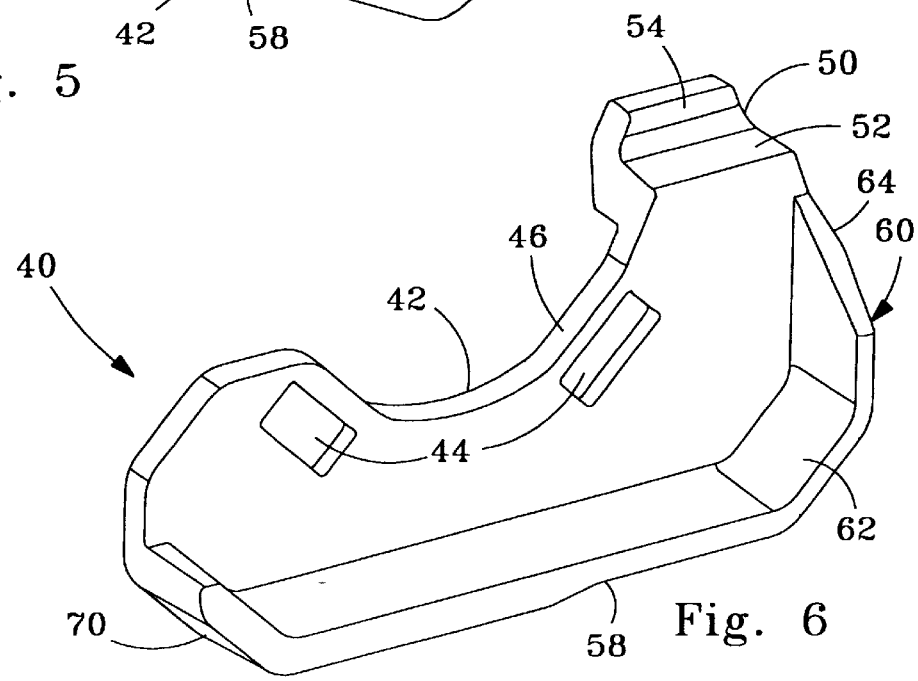

BEARING GUARD FOR A GROUND-WORKING IMPLEMENT

FIELD OF THE INVENTION

The present invention relates generally to agricultural equipment having bearing assemblies operating in a hostile environment, and more specifically to a bearing guard for such bearing assemblies.

BACKGROUND OF THE INVENTION

On certain agricultural implements such as disks, disk gang bearings are subject to contamination and wear by the constant contact with moving material such as soil and debris during field operations. Various types of wear guards are available to protect the bearings and bearing flanges from the material, including a sheet metal guard which provides some bearing flange protection. However, no protection is provided for the grease zerk, and the guard tends to catch and drag trash and field debris. The guard also wears relatively quickly and is subject to damage, particularly in sandy or rocky soil conditions. A second type of guard is cast from grey iron but does not mate with existing bearing mounting plates and also does not provide zerk protection.

SUMMARY OF THE INVENTION

It is therefore an object of the invention to provide an improved bearing wear guard. It is another object to provide such a guard which overcomes most or all of the aforementioned problems.

It is a further object of the invention to provide an improved bearing wear guard which mates with current bearing mounting plates. It is another object to provide such a guard which protects the grease zerk.

It is still another object to provide an improved bearing wear guard which is longer lasting and sheds trash and debris more easily than at least most previously available trash guards. It is yet another object to provide such a guard which protects the bearing, bearing support structure and grease zerk and yet does not catch trash.

A guard for a bearing assembly with a bearing mounted on a bracket includes a body portion supported from the bearing bracket by a pair of bolts that also attach the bearing flange to the bracket. The guard is supported adjacent the bearing and includes an upper edge conforming generally to the shape of a portion of the rotatable tool structure. A zerk-protecting area is supported from the body portion for protecting the port from the abrasive soils and rocks.

A trash shedding surface with portions angled relative to the forward direction directs trash around the bearing and bearing bracket. The bearing wear guard extends under the bearing and forwardly of the bearing bracket. The zerk-protecting area projects upwardly and outwardly from the upper edge and partially defines an upwardly opening channel-shaped area which protects the zerk from rocks and abrasive soils. In the preferred embodiment, the guard is fabricated as a unitary wear-resistant casting and may be retrofitted onto most available bearing supports.

BRIEF DESCRIPTION OF THE DRAWINGS

FIG. 3 is a plan view of the wear guard.

FIG. 4 is an end view of the wear guard of FIG. 3.

FIG. 5 is a perspective view of the wear guard of FIG. 3.

FIG. 6 is a view similar to that of FIG. 5 but taken from the opposite side of the wear guard.

DESCRIPTION OF THE PREFERRED EMBODIMENT

Figure 1:
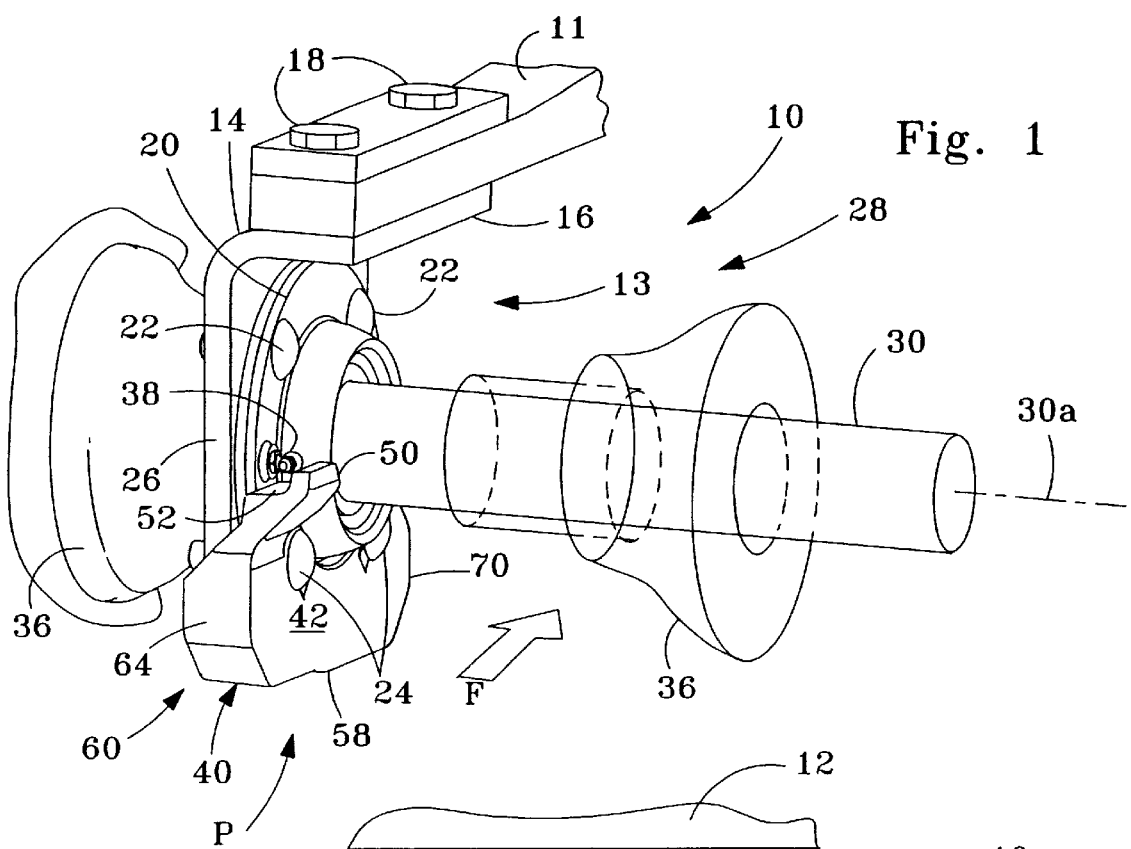
FIG. 1 is a perspective view of a disk bearing assembly including a mounting plate with a wear guard attached.
Figure 2:
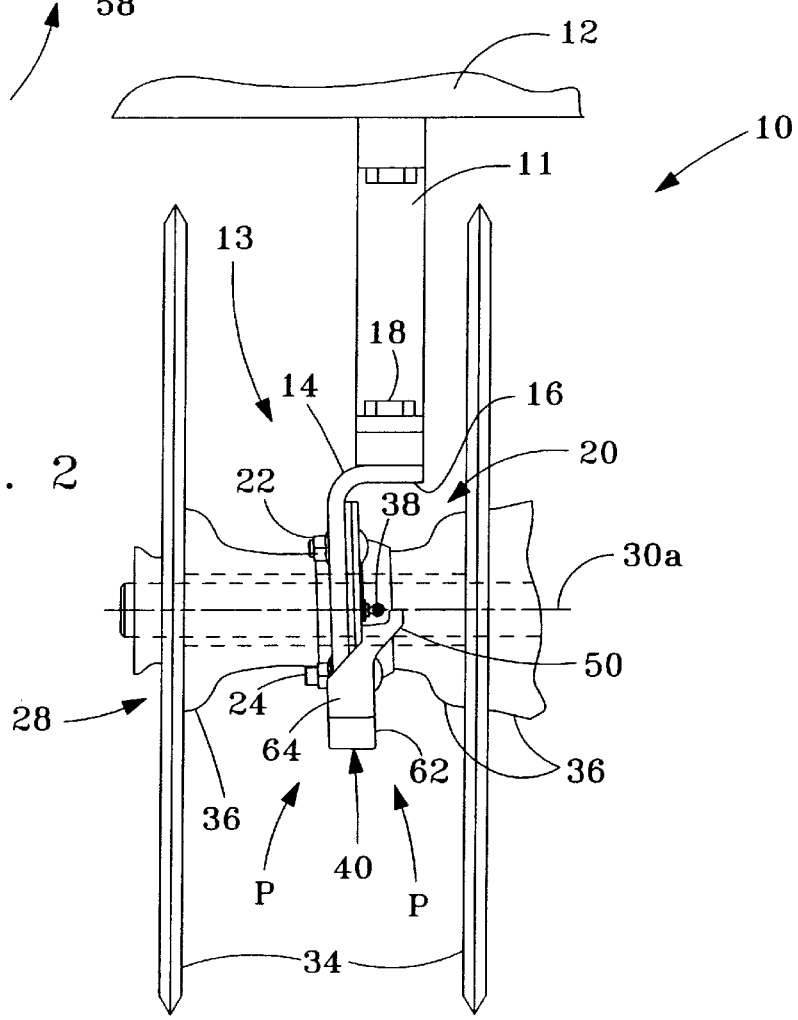
FIG. 2 is a rear view of the disk bearing assembly of FIG. 1.

Referring to FIGS. 1 and 2, therein is shown a portion of an implement such as a disk 10 which is of generally conventional construction. As shown, a disk standard 11 extends downwardly from a main frame 12 which is supported for forward movement in a forward direction F over a field to be tilled. A bearing support assembly 13 includes an angled bearing mounting bracket 14 supporting a disk bearing assembly 15. The bracket 14 includes an upper generally horizontal flange 16 connected to the standard 11 by a pair of mounting bolts 18. A flanged bearing 20 is connected by bolts 22 and 24 to one side of an upright leg 26 of the mounting plate 14. Rotatable tool structure 28 is supported from the assembly 13 and includes a disk gang bolt 30 which extends through and is supported by the bearing 20 for rotation about an axis 30a having a substantial component in a direction transverse to the forward direction.

Disks 34 are secured between spacers 36 for rotation in unison about the axis 30a. A grease zerk or similar lubricant-receiving port 38 is connected to and projects from the bearing 20 for applying lubricant from a grease gun or the like to the bearing. To protect the bearing area from trash, rocks and abrasive soil moving generally in a path indicated at P, a bearing wear guard 40 is connected by the bolts 24 to the leg 26 forwardly of and below the bearing 20 in the path P.

The bearing wear guard 40 includes an outer wall or main body portion 42 with two slots 44 near an upper or proximate edge 46. The slots 44 receive the mounting bolts 24 which secure the guard 40 in a protecting position in the material path P adjacent the bearing 20. The wall 42 has an upper edge 46 which conforms generally to the shape of the lower portion of the bearing 20 adjacent the gang bolt 30 (see FIG. 1). The edge 46 extends forwardly to an upwardly and outwardly offset zerk-protecting area 50 having an upwardly facing surface 52 located directly below the zerk 38. An inwardly facing surface 54 and the flange of the bearing 20 define an upwardly opening protective channel for the zerk 38 which extends forwardly beyond the end of the receiving end of the zerk to protect the zerk from rocks and abrasive material while still providing access to the zerk for greasing of the bearing.

The guard 40 has a generally planar bottom portion 58 which extends inwardly toward the lowermost portion of the upright leg 26. A rear trash-shedding face 60 includes a first portion 62 which extends upwardly at an acute angle to the bottom portion 58 and joins an upright rearmost portion 64 with a top edge that angles upwardly towards the area 50. A forward trash-deflecting surface 70 extends upwardly and rearwardly at an acute angle to the bottom portion 58 and helps deflect material heading toward the front of the bearing area.

The cross section of the guard 40 is generally L-shaped so that the guard generally wraps around and protects the bearing, bearing support and zerk. Fabricating the guard as a unitary casting provides extended wear life compared to sheet metal guards.

Having described the preferred embodiment, it will become apparent that various modifications can be made without departing from the scope of the invention as defined in the accompanying claims.

What is claimed is:

1. In an implement adapted for movement in a forward direction over the ground and having a bearing assembly with a bearing mounted on a bearing bracket defining a rotational axis, the bearing including a projecting lubricant-receiving port and supporting rotatable tool structure for rotation about the axis for earth-engaging operation where abrasive soils and rocks may be present, a bearing wear guard for protecting the bearing assembly from wear and breakage as the soils and rocks move in a material path towards the bearing assembly, the bearing wear guard comprising:

a body portion supported from the bearing bracket adjacent the bearing and having a proximate portion conforming generally to the shape of a portion of the rotatable tool structure, the body portion extending only partially around the bearing and including an angled trash-shedding surface for preventing the abrasive soils and rocks from impacting the bearing; and a port-protecting area supported from the body portion adjacent the lubricant-receiving port in the material path for protecting the port from the abrasive soils and rocks, the port-protectinq area extending axially outwardly of the bearing.

2. The bearing wear guard set forth in claim 1 wherein the port-protecting area and the bearing define a protective channel for the port preventing material in the path from impinging on the port.

3. The bearing wear guard set forth in claim 1 including a forward trash shedding face extending at an angle to the forward direction forwardly of the bearing and the bearing bracket for directing trash around the bearing and bearing bracket.

4. The bearing wear guard set forth in claim 1 wherein the body portion extends under the bearing and forwardly of the bearing bracket and the proximate portion comprises an upper edge of the body portion, and wherein the port-protecting area projects upwardly from the upper edge.

5. The bearing wear guard set forth in claim 4 wherein the port-protecting area extends outwardly in a direction transverse to the forward direction and defines an upwardly opening, port-protecting area above the body and outwardly of the port.

6. The bearing wear guard set forth in claim 1 comprising a unitary casting fabricated from abrasion resistant metal and including a forward trash shedding surface leading the bearing and the bearing bracket.

7. The bearing wear guard set forth in claim 6 wherein the port-protecting area comprises a projection extending outwardly and upwardly from the body portion.

8. In an implement having a bearing assembly with a bearing mounted on a bearing bracket and a lubricant-receiving port projecting from the bearing, the bearing assembly adapted for supporting rotatable tool structure for earth-engaging operation where abrasive soils and rocks may be present, a bearing wear guard for protecting the bearing assembly from wear and breakage as the soils and rocks move in a material path towards the bearing assembly, the bearing wear guard comprising:

a body portion including support structure for connecting the body portion to the bearing bracket adjacent the bearing, the body portion also having a proximate portion adapted for support adjacent the rotatable tool structure;

a port-protecting cavity portion connected to the body portion and defining a protective area for the port for preventing the soils and rocks in the material path from impinging on the port; and wherein the body portion has a generally L-shaped cross section defining a trash shedding surface.

9. The bearing wear guard set forth in claim 8 including a projection extending upwardly and outwardly from the body portion and wherein the cavity portion is located within the projection.

10. The bearing wear guard set forth in claim 9 wherein the projection extends upwardly and outwardly from the proximate portion.

11. A bearing wear guard for an earthworking tool bearing assembly mounted on a bearing support in a path of trash, rocks and abrasive soil and having a projecting lubrication port, the wear guard including an apertured body portion, mounting bolts for securing the body portion from the bearing support in a protecting position in the path, a port-protecting area projecting from the body portion to protect the zerk from rocks and abrasive material, and wherein the body portion includes an angled trash-shedding surface, and wherein the port-protecting area projects from the trash-shedding surface.

12. The wear guard set forth in claim 11 wherein the body portion, trash-shedding surface and port-protecting area are cast as a unitary structure.

13. The wear guard set forth in claim 12 wherein the port-projecting area is offset laterally from the body portion.

14. In an implement adapted for movement in a forward direction over the ground and having a bearing assembly with a bearing mounted on a bearing bracket, the bearing including a projecting lubricant-receiving port and supporting rotatable tool structure for earth-engaging operation where abrasive soils and rocks may be present, a bearing wear guard for protecting the bearing assembly from wear and breakage as the soils and rocks move in a material path towards the bearing assembly, the bearing wear guard comprising:

a body portion supported from the bearing bracket adjacent the bearing and having a proximate portion conforming generally to the shape of a portion of the rotatable tool structure;

a port-protecting area supported from the body portion adjacent the lubricant-receiving port in the material path for protecting the port from the abrasive soils and rocks; and wherein the body portion has generally an L-shaped cross section with bottom and end portions defining trash shedding surfaces.

15. In an implement adapted for movement in a forward direction over the ground and having a bearing assembly with a bearing mounted on a bearing bracket, the bearing including a projecting lubricant-receiving port and supporting rotatable tool structure for earth-engaging operation where abrasive soils and rocks may be present, a bearing wear guard for protecting the bearing assembly from wear and breakage as the soils and rocks move in a material path towards the bearing assembly, the bearing wear guard comprising:

a body portion supported from the bearing bracket adjacent the bearing and having a proximate portion conforming generally to the shape of a portion of the rotatable tool structure;

a port-protecting area supported from the body portion adjacent the lubricant-receiving port in the material Path for protecting the port from the abrasive soils and rocks;

wherein the port-protecting area comprises a projection extending outwardly and upwardly from the body portion;

wherein the projection extends laterally from the body portion in a first lateral direction and further including a forward trash shedding surface extending laterally in a direction opposite the first lateral direction at a location forwardly of the bearing bracket; and wherein the bearing wear guard comprises a unitary casting fabricated from abrasion resistant metal defining the forward trash shedding surface in leading relationship to the bearing and the bearing bracket.

16. A bearing wear guard for an earthworking tool bearing assembly mounted on a bearing support in a path of trash, rocks and abrasive soil and having a projecting lubrication port, the wear guard including an apertured body portion, mounting bolts for securing the body portion from the bearing support in a protecting position in the path, a port-protecting area projecting from the body portion to protect the zerk from rocks and abrasive material, and wherein the body portion includes leading and trailing angled trash shedding surfaces to prevent trash from catching and building up on the guard.

17. A bearing wear guard for an earthworking tool bearing assembly mounted on a bearing support in a path of trash, rocks and abrasive soil and having a projecting lubrication port, the wear guard including an apertured body portion, mounting bolts for securing the body portion from the bearing support in a protecting position in the path, a port-protecting area projecting from the body portion to protect the zerk from rocks and abrasive material, and wherein the body portion has a generally L-shaped cross section with a lower bearing support protecting leg.

18. A bearing wear guard for an earthworking tool bearing assembly mounted on a bearing support in a path of trash, rocks and abrasive soil and having a projecting lubrication port, the wear guard including an apertured body portion, mounting bolts for securing the body portion from the bearing support in a protecting position in the path, a port-protecting area protecting from the body portion to protect the zerk from rocks and abrasive material, and wherein the body portion includes a boundary portion conforming generally to the shape of a portion of the bearing and the port-protecting area projects upwardly and outwardly from the boundary portion.

* * * * *